United States Patent [19]

Vickers

[11] Patent Number: 4,710,385

[45] Date of Patent: Dec. 1, 1987

[54] COMBINATION SOAP AND FISH BAIT

[76] Inventor: Ken M. Vickers, Rte. #1, Ambrose, Ga. 31512

[21] Appl. No.: 927,158

[22] Filed: Nov. 5, 1986

[51] Int. Cl.⁴ .................... A01K 85/00; C11D 9/38; C11D 9/40; C11D 17/00

[52] U.S. Cl. .................................... 426/1; 43/4.5; 252/132; 252/134; 252/DIG. 5

[58] Field of Search ............... 426/1; 43/4.5; 252/132, 252/134, DIG. 5

[56] References Cited

U.S. PATENT DOCUMENTS

| | | | |
|---|---|---|---|
| 2,452,552 | 11/1948 | Curtis | 426/1 |
| 3,410,689 | 11/1968 | Nathan | 426/1 |
| 3,666,669 | 5/1972 | Noordam | 252/132 |
| 3,931,414 | 1/1976 | Popeil | 426/1 |
| 4,486,460 | 12/1984 | Kienast | 427/4 |
| 4,634,592 | 1/1987 | Faber | 426/1 |
| 4,666,717 | 5/1987 | Smith | 426/1 |

FOREIGN PATENT DOCUMENTS

| | | | |
|---|---|---|---|
| 0138346 | 8/1982 | Japan | 426/1 |
| 0198053 | 12/1982 | Japan | 426/1 |

*Primary Examiner*—Dennis L. Albrecht
*Attorney, Agent, or Firm*—John B. Dickman, III

[57] ABSTRACT

A fish bait composition for luring fish which can also be used as a hand soap to remove human scent. The fish bait composition is manufactured in a way to entrap the luring qualities within the composition, thereby reducing any odoriferous aromas. As such, the composition is comprised of a soap carrier blended with an essence from the group including poultry fat, fish solubles, fish oils, fish meat and poultry liver. One or more of the essences may be included in the final composition and percentage of any one essence may be from 0-10%. To give the bait composition a more solid base and attract fish like catfish, a vegetable meal and a fish meal is added. The combined percentage of vegetable meal and fish meal is about 40%.

The essences entrapped in the fish bait composition are slowly released from the soap carrier either as particles or as aromas trapped in soap bubbles.

2 Claims, No Drawings

COMBINATION SOAP AND FISH BAIT

BACKGROUND OF THE DISCLOSURE

The present invention relates to a fish bait composition which releases an essence in water to lure fish, and in particular to a fish bait composition which can be used as a hand soap to remove human scent and has a shelf life without giving off odoriferous aromas.

There are prior art fish baits which use essences trapped in a soap carrier. One such composition is described in U.S. Pat. No. 2,452,552, issued to Curtis et al. The Curtis et al composition uses a saponified grease to form a soap, a grease, or an oil such as coco oil. The carrier is impregenated with an essence derived from decaying fish or animal. Curtis et al's composition is described as being suitable for luring crustaceans, like lobsters.

Another prior art fish bait and fisherman's soap is described in U.S. Pat. No. 3,666,669, issued to Noordam. A liquid soap carrier blended with anise oil and cinnamon whereby when the soap is cured it can be used in bar form. Human scent is removed from bait by washing it with the soap and anise oil and cinnamon are added to the bait to help attract fish.

The prior art has shortcomings which are overcome by the present invention. There is no one composition expressly designed for catching fish, such as catfish, and while the Noordam composition can be used with a fish bait it does not use the essences or similar composition that will be described as the present invention.

SUMMARY OF THE INVENTION

A fish bait composition for luring fish which is comprised of a soap carrier of tallow, coco oil and sodium hydroxide, a solid binder of at least one of the following: vegetable meal and fish meal, and at least one essence selected from the group comprising: fish solubles, fish oil, poultry fat and poultry liver.

The fish bait is manufactured by blending the soap composition with up to 10% of one or more essences and up to about 40% vegetable and/or fish meal. The mixture is dehydrated to remove excess water and extruded in a desired size and shape. After extrusion the fish bait is cooled, aged and aired to remove any odoriferous aromas.

The composition is also used to mask human scents which are known to repel fish.

DESCRIPTION OF THE INVENTION

The fish bait composition of this invention uses a well-known soap composition of tallow, coco oil (coconut oil) and sodium hydroxide which are mixed in a mixer at 30°-40° C. until a homogenious emulsion is formed. The coco oil, up to 25% of the soap composition, is added and the blend is molded where completion of the saponification process takes place.

It is well-known that coco oil soaps give a loose lather consisting of large unstable bubbles, whereas higher molecular weight soaps, such as tallow, give a close lather consisting of fine stable bubbles.

These facts are important to the present invention since the coco oil bubbles entrap the essences as the soap dissolves and carries them through the water to serve as a lure for nearby fish. The tallow dissolves slowly to serve as a time release for the essence and coco oil which along with the essences attract fish.

The essences of the fish composition comprise up to 10% of the total composition and may be comprised of one or more of the following: fish solubles (intestines, liver, etc.), fish oil, poultry fat and poultry liver. A typical essence composition may include: liver flavor (fish or poultry) 1%, and salmon oil 4%, or poultry fat 5% and fish solubles 5%.

Animal meal and vegetable meal are added to the composition as binders and solid bait material. The preferred animal meal is fish meal, in the range of 10-40%. Cottonseed meal is the preferred vegetable meal, in the range of 0-30%.

An example of the fish bait composition would include the following:
cottonseed meal: 0-30%
fish meal: 10-40%
fish liver: 0-1%
poultry liver: 0-1%
poultry fat: 0-4%
fish solubles (intestines, etc.): 0-4%
salmon oil: 0-4%
soap: 45-55%.

A preferred composition is comprised of:
cottonseed meal: 30%
fish meal: 10%
poultry liver: 1%
salmon oil: 4%
soap: 55%.

The soap is melted and the other ingredients are added and the mixture is blended and dehydrated by steam coils to remove water. The composition is then extruded and cooled. Aging and airing removes almost all oderiferous aromas.

It should be understood by those skilled in the art that one could substitute similar essences and/or animal meal or vegetable meal without departing from the invention. Further the percentages given may be similarly changed without departing from the invention. In which case one should refer to the claim for a clear understanding of the invention.

I claim:

1. A fish bait composition consisting essentially of about 55% soap carrier, about 1% poultry liver, about 4% salmon oil, about 10% fish meal and about 30% cottonseed meal.

2. A fisherman's hand soap for removing the human scent that repels fish consisting essentially of about 55% soap carrier, about 1% poultry liver, about 4% salmon oil, about 10% fish meal and about 30% cottonseed.

* * * * *